(12) United States Patent
Lee et al.

(10) Patent No.: US 11,425,203 B2
(45) Date of Patent: Aug. 23, 2022

(54) COMMISSIONING A VIRTUALIZED NETWORK FUNCTION

(71) Applicant: Metaswitch Networks Ltd, Enfield (GB)

(72) Inventors: Andrew Lee, Enfield (GB); David Hotham, Enfield (GB); Joe Powell, Enfield (GB); Philip Davies, Enfield (GB); Michael Duppre, Enfield (GB); Jamie Parsons, Enfield (GB); Steve Orbell, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 16/850,874

(22) Filed: Apr. 16, 2020

(65) Prior Publication Data
US 2020/0344305 A1    Oct. 29, 2020

(30) Foreign Application Priority Data
Apr. 23, 2019 (GB) ...................................... 1905654

(51) Int. Cl.
*H04L 67/141* (2022.01)
*H04L 12/46* (2006.01)
*G06F 9/455* (2018.01)

(52) U.S. Cl.
CPC ........ *H04L 67/141* (2013.01); *G06F 9/45558* (2013.01); *H04L 12/4641* (2013.01);
(Continued)

(58) Field of Classification Search
CPC ............... H04L 67/141; H04L 12/4641; G06F 9/45558; G06F 2009/4557; G06F 2009/45591; G06F 2009/45595
See application file for complete search history.

(56) References Cited

U.S. PATENT DOCUMENTS

2015/0288541 A1* 10/2015 Fargano .................. H04L 43/08
709/225
2017/0078216 A1* 3/2017 Adolph ............... G06F 9/45558
(Continued)

FOREIGN PATENT DOCUMENTS

WO    2017142577 A1    8/2017

OTHER PUBLICATIONS

Baldi et al.,"Modeling Native Software Components as Virtual Network Functions", SIGCOM 2016:Proceedings of the 2016 ACM SIGCOMM Conference, Aug. 2016, ACM Digital Library.*
(Continued)

*Primary Examiner* — Todd L Barker
(74) *Attorney, Agent, or Firm* — Newport IP, LLC; Han K. Gim

(57) ABSTRACT

Certain aspects provide a method of commissioning a virtualized network function (VNF), including: at a commissioning virtual machine instantiated in a virtualized environment of a customer network, configuring a remote access connection facility for accessing the commissioning virtual machine remotely from outside of the customer network, wherein the commissioning virtual machine has access to a virtual infrastructure manager (VIM) component of the virtualized environment; causing, via the remote access connection facility, configuration of a VNF manager component within the commissioning virtual machine; and causing, via the remote access connection facility, the configured VNF manager component to instruct the VIM component to instantiate one or more virtual machines in the virtualized environment, the one or more virtual machines being operable to perform at least a part of the VNF.

20 Claims, 3 Drawing Sheets

(52) U.S. Cl.
CPC ............... *G06F 2009/4557* (2013.01); *G06F 2009/45591* (2013.01); *G06F 2009/45595* (2013.01)

(56) References Cited

U.S. PATENT DOCUMENTS

| | | | |
|---|---|---|---|
| 2018/0034801 A1 | 2/2018 | Nakano et al. | |
| 2018/0191581 A1* | 7/2018 | Yu | H04L 41/5041 |
| 2018/0309621 A1* | 10/2018 | Yuan | H04L 29/08 |
| 2019/0222611 A1* | 7/2019 | Lin | G06F 9/45558 |

OTHER PUBLICATIONS

ETSI, "Network Functions Virtualization (NFV) Release 2; Protocols and Data Models VNF Package Specification", Feb. 2018.*

Rosa et al,, "Take Your VNF to teh Gym: A Testing Framework for Auttomated NFV Performance Benchmarking", Sep. 2017, IEEE Communications Magazine.*

Cattaneo et al., "Deploying CPU—Intensive Applications on MEC in NFV Systems; The Immersive Video Use Case", Oct. 2018, MDPI Publshing.*

Search Report for United Kingdom Application No. GB1905654.8, dated Oct. 22, 2019, 5 pages.

ETSI GS NFV-MAN 001 VI. 1.1 (Dec. 2014), ETSI Groups Specification Network Functions Virtualisation (NFV); Management and Orchestration, Published 2014, ETSI.

* cited by examiner

COMMISSIONING A VIRTUALIZED NETWORK FUNCTION

CROSS-REFERENCE TO RELATED APPLICATIONS

This application claims priority to United Kingdom Patent Application No. 1905654.8, filed Apr. 23, 2019, the entire contents of which are incorporated herein by reference.

INTRODUCTION

Technical Field

The present disclosure relates to commissioning a virtualized network function.

Background

Network function virtualization (NFV) is used to virtualize network node functions to create communication services. Instead of providing custom hardware appliances for each network function, a virtualized network function (VNF) may comprise one or more virtual machines (VMs) running various software and processes, instantiated on standard server equipment, switches, storage devices and/or cloud computing architecture.

In some known systems, to commission a VNF in a virtualized environment of a customer network, a customer manually instantiates all of the VMs that are required to perform the VNF. Once the VMs are instantiated, an engineer (e.g. from a VNF software provider) may be granted access to the customer network (e.g. via a virtual private network (VPN) server located on one of the VMs), to configure the VMs to perform the VNF. However, relying on customers to instantiate the VMs often results in errors which later require diagnosing and fixing. For example, a given VM may not have been instantiated correctly and/or using correct configuration information. Further, it may be inconvenient for the customer to have to instantiate and configure VMs to perform a VNF. The commissioning process can therefore be inefficient for both customer and service-provider.

It is therefore desirable to provide improved methods for commissioning a VNF.

BRIEF SUMMARY

According to a first aspect, there is provided a method of commissioning a virtualized network function (VNF), the method comprising: at a commissioning virtual machine instantiated in a virtualized environment of a customer network, configuring a remote access connection facility for accessing the commissioning virtual machine remotely from outside of the customer network, wherein the commissioning virtual machine has access to a virtual infrastructure manager (VIM) component of the virtualized environment; causing, via the remote access connection facility, configuration of a VNF manager component within the commissioning virtual machine; and causing, via the remote access connection facility, the configured VNF manager component to instruct the VIM component to instantiate one or more virtual machines in the virtualized environment, the one or more virtual machines being operable to perform at least a part of the VNF.

The method of the first aspect enables the VNF commissioning process to be less reliant on the customer to perform certain steps of the commissioning process correctly, thereby reducing the likelihood of human error and the problems arising therefrom. The commissioning process is thus made more reliable and/or efficient, as well as being more convenient for the customer. For example, only the commissioning VM may be instantiated by the customer, and the commissioning VM may be less complex, more lightweight, and/or easier to instantiate and/or configure than VMs that are to perform the VNF. The commissioning VM may be considered to be the "first" element of the network, in that it is responsible for instantiating and configuring other, subsequent elements. Once the commissioning VM is instantiated, a remote engineer, accessing the commissioning VM via the remote access connection facility, can oversee the rest of the commissioning process. As such, more of the commissioning process may be overseen by the engineer, and less by the customer, compared to comparative systems which do not use the method of the first aspect. In particular, the engineer may be able to become involved at an earlier stage in the commissioning process, namely before the VMs that are to perform the VNF have been instantiated, thereby reducing a likelihood that those VMs are incorrectly set up.

Moreover, providing a remote access connection facility in the commissioning VM may be more secure than providing such a remote access connection facility elsewhere in the customer network, e.g. in the VIM component. For example, the commissioning VM (and its associated remote access connection facility) may be torn down after completion of the commissioning process, thereby minimizing the opportunity for potentially malicious third parties to access the customer network. Further, the commissioning VM may be configured to limit what actions a user who accesses via the remote access connection facility can perform. Such actions may be limited to a pre-approved list of actions, for example. Additionally or alternatively, the commissioning VM may be configured to limit which other entities a remote user can access and/or communicate with. Further, a single point of access is easier to monitor, e.g. for irregularities and/or breaches, than multiple points of access. Providing a single point of remote access on the commissioning VM, that is controllable and optionally temporary, may thus be more safe and/or secure, whilst still providing for remote access to oversee the commissioning process, than a case in which remote access is provided elsewhere in the customer network.

According to a second aspect, there is provided an apparatus comprising at least one processor and at least one memory including computer program code, the at least one memory and the computer program code being configured to, with the at least one processor, cause the apparatus to perform a method for use in commissioning a virtualized network function (VNF), the method comprising: at a commissioning virtual machine instantiated in a virtualized environment of a customer network, configuring a remote access connection facility for accessing the commissioning virtual machine remotely from outside of the customer network, wherein the commissioning virtual machine has access to a virtual infrastructure manager (VIM) component of the virtualized environment; causing, via the remote access connection facility, configuration of a VNF manager component within the commissioning virtual machine; and causing, via the remote access connection facility, the configured VNF manager component to instruct the VIM component to instantiate one or more virtual machines in the virtualized environment, the one or more virtual machines being operable to perform at least a part of the VNF.

According to a third aspect, there is provided a computer program product comprising a non-transitory computer-readable storage medium having computer-readable instructions stored thereon, the computer-readable instructions being executable by a computerized device to cause the computerized device to perform a method of commissioning a virtualized network function (VNF), the method comprising: at a commissioning virtual machine instantiated in a virtualized environment of a customer network, configuring a remote access connection facility for accessing the commissioning virtual machine remotely from outside of the customer network, wherein the commissioning virtual machine has access to a virtual infrastructure manager (VIM) component of the virtualized environment; causing, via the remote access connection facility, configuration of a VNF manager component within the commissioning virtual machine; and causing, via the remote access connection facility, the configured VNF manager component to instruct the VIM component to instantiate one or more virtual machines in the virtualized environment, the one or more virtual machines being operable to perform at least a part of the VNF.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1:
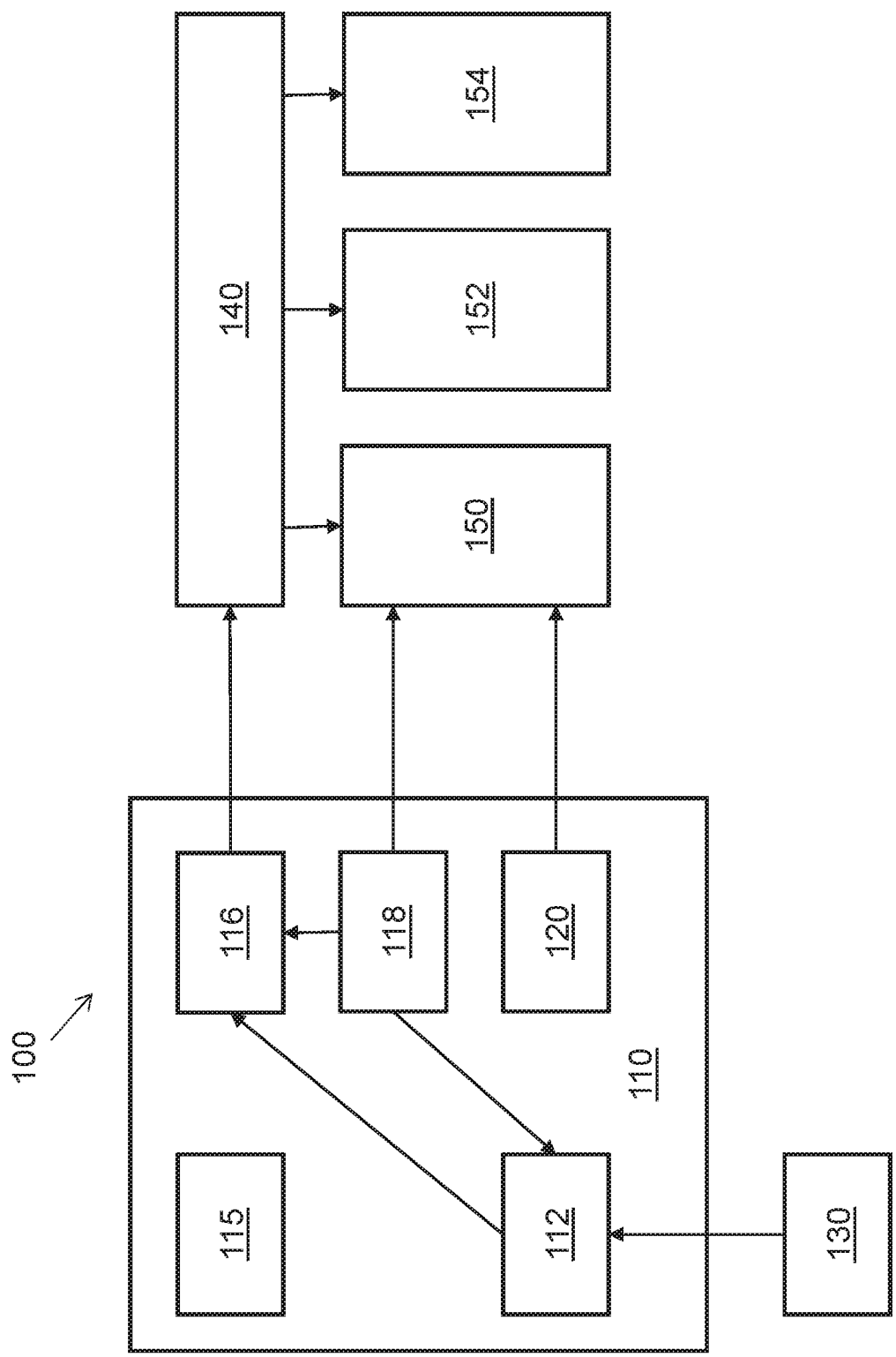
FIG. 1 shows a schematic view of a virtualized environment of a customer network according to embodiments of the present disclosure.

Referring to FIG. 1, there is shown a virtualized environment 100 of a customer network, according to embodiments. The environment 100 includes a commissioning virtual machine (VM) 110. The commissioning VM 110 is configured to perform methods of commissioning a virtualized network function (VNF) according to embodiments of the present disclosure. A VNF is configured to perform a particular network function, and multiple VNFs may be used within a virtualized environment. An example of a VNF is a telephony service.

The commissioning VM 110 is instantiated in the virtualized environment 100 of the customer network. As such, the commissioning VM 110 may be running on one or more physical resources associated with the customer network.

The commissioning VM 110 comprises a remote access connection facility 115. In embodiments, the remote access connection facility 115 comprises a virtual private network (VPN) connection facility. For example, the remote access connection facility 115 may comprise a VPN server function. The remote access connection facility 115 comprises other connection means in alternative embodiments. The remote access connection facility 115 enables the commissioning VM 110 be accessed remotely from outside the customer network. For example, the remote access connection facility 115 may be useable to access the commissioning VM 110 from a VNF software provider network, or from any other network or location, via an Internet Protocol (IP) address associated with the VPN server function on the commissioning VM 110. Remote access to the commissioning VM 110 may be provided for a remote commissioning engineer, according to embodiments.

In embodiments, the commissioning VM 110 also comprises a VNF manager component 116, a VNF descriptor component 112, a version control component 118, and a VNF testing component 120, as will be described in more detail below. The various components 112, 115, 116, 118, 120 of the commissioning VM 110 are logically distinct from one another, according to embodiments. In alternative embodiments, one or more of the components 112, 115, 116, 118, 120 may be logically combined with one or more other of the components 112, 115, 116, 118, 120.

One or more of the components 112, 115, 116, 118, 120 may be created in response to, or as part of, instantiation of the commissioning VM 110. For example, one or more of the components 112, 115, 116, 118, 120 may be created automatically when the commissioning VM 110 is booted. As such, relatively little configuration of the commissioning VM 110 is required by a customer, and after instantiation of the commissioning VM 110 an engineer can access the commissioning VM 110 via the remote access connection facility 115, to perform subsequent configuration and instantiation steps in the environment 100. The commissioning VM 110 may be relatively easy for a customer to instantiate, compared to a case in which the customer is required to instantiate (and configure) other VMs in the environment that are to perform the VNF. The commissioning VM 110, which is dedicated to the task of instantiating and configuring other VMs to perform VNFs, is less complex and/or more lightweight than such other VMs, and is thus easier for a customer to instantiate and/or configure. Further, the customer only instantiates a single VM (namely the commissioning VM 110), rather than multiple VMs in the environment 100. Moreover, in embodiments, the commissioning VM 110 can be instantiated and/or configured without knowledge of the particular properties of the customer network. That is, the commissioning VM 110 may be provided as a "standard" VM, instead of being bespoke to the particular customer network. Data that is customer network-specific can be provided at a later stage, by the remote engineer.

In alternative embodiments, one or more of the components 112, 115, 116, 118, 120 are created manually and/or based on user input following instantiation of the commissioning VM 110. In alternative embodiments, the commissioning VM 110 is not instantiated by a customer. For example, instantiation of the commissioning VM 110 may be performed remotely, e.g. via a remote access connection facility in a further VM.

The commissioning VM 110 may comprise more, fewer and/or different components in other embodiments. For example, in some embodiments the commissioning VM 110 does not comprise a version control component 118. In some embodiments, the commissioning VM 110 does not comprise a VNF testing component 120.

The commissioning VM 110 has access to a virtual infrastructure manager (VIM) component 140 of the virtualized environment 100. The VIM component 140 may be configured to manage the virtualized infrastructure of the environment 100. Additionally or alternatively, the VIM component 140 may be configured to monitor and/or manage the allocation of virtual resources to physical resources in the customer network, manage hardware and/or software resources associated with the environment 100, and/or collect performance data from VMs within the environment 100.

In embodiments, the VIM component 140 is capable of instantiating VMs in the virtualized environment 100. Such VMs could be instantiated manually, e.g. by a customer interacting with the VIM component 140 in the customer network. However, customer-instantiated VMs may be relatively prone to errors and/or misconfigurations. In contrast, in embodiments of the present disclosure, instantiation of VMs is controlled via the commissioning VM 110, which has access to the VIM component 140. The commissioning VM 110, in turn, may be controlled remotely via the remote access connection facility 115, e.g. by a commissioning engineer. Therefore, the need for the customers themselves to instantiate the VMs for performing the VNF is reduced. Further, by providing remote access via the commissioning VM 110 (which may be torn down following completion of the commissioning process), the need for a remote access connection facility 115 in the VIM component 140 is reduced, and in some cases avoided entirely, thereby increasing security in the customer network compared to a case in which a remote access connection facility, e.g. a VPN server, is provided in the VIM component 140 to allow a remote engineer to configure the virtualized environment 100.

In embodiments of the present disclosure, the commissioning VM 110 is configured to instruct the VIM component 140 to instantiate one or more VMs 150, 152, 154 that are operable to perform the desired VNF, as will be described in more detail below. The commissioning VM 110 is logically distinct from the VIM component 140 and each of the VMs 150, 152, 154 that perform the desired VNF. However, the commissioning VM 110 may be located on the same physical machine as the VIM component 140 and/or the one or more VMs 150, 152, 154. Alternatively, the commissioning VM 110 may be located on a different physical machine to the VIM component 140 and/or the one or more VMs 150, 152, 154.

Figure 2:
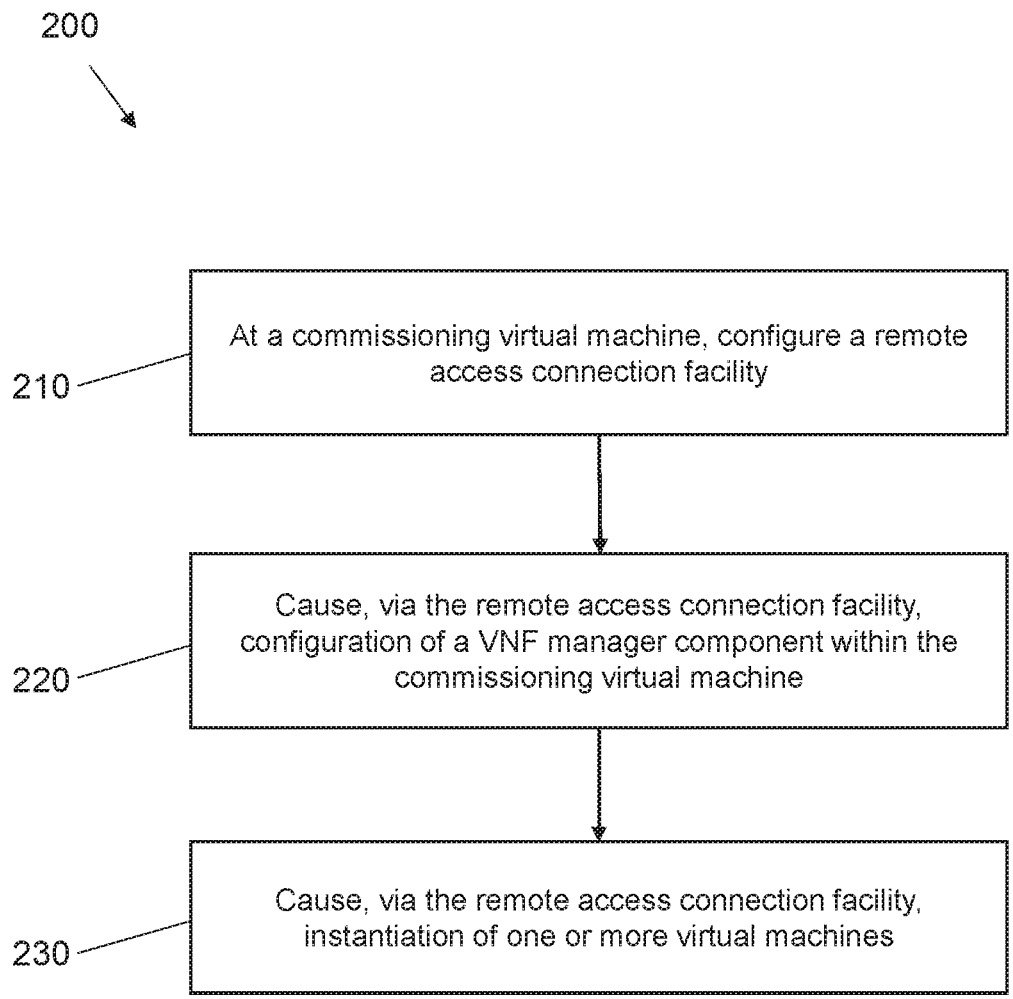
FIG. 2 shows a flow chart depicting a method of commissioning a virtualized network function according to embodiments of the present disclosure.

Referring to FIG. 2, there is shown a method 200 of commissioning a VNF according to embodiments. The method 200 may be performed at least in part by the commissioning VM 110 that is instantiated in the virtualized environment 100 of the customer network, as described with reference to FIG. 1 above.

At item 210, the remote access connection facility 115 is configured at the commissioning VM 110. The remote access connection facility 115 is configured for accessing the commissioning VM 110 remotely from outside the customer network. Configuring the remote access connection facility 115 may comprise establishing a connection with the remote access connection facility 115 from a remote location. In some examples, configuring the remote access connection facility 115 comprises creating the remote access connection facility 115. For example, an IP address may be obtained and/or associated with the remote access connection facility 115.

At item 220, configuration of the VNF manager component 116 within the commissioning VM 110 is caused, via the remote access connection facility 115. In embodiments, the VNF manager component 116 is configured to perform lifecycle management of VNFs in the environment 100. For example, the VNF manager component 116 may be configured to cause instantiation, scaling, updating, upgrading and/or termination of VNFs. The VNF manager component 116 may be configured to manage a single VNF or multiple VNFs. The managed VNFs may be of the same or different types. In embodiments, configuration of the VNF manager component 116 may involve providing the VNF manager component 116 with a description of the VNF that is being commissioned.

At item 230, the configured VNF manager component 116 is caused, via the remote access connection facility 115, to instruct the VIM component 140 to instantiate one or more VMs 150, 152, 154 in the virtualized environment 100. The one or more VMs 150, 152, 154 are operable to perform at least part of the VNF. Each of the VMs 150, 152, 154 may comprise a VNF component instance (VNFCI). In embodiments, a description of the VNF provided to the VNF manager component 116 during configuration of the VNF manager component 116 enables the VNF manager component 116 to instruct the instantiation of the one or more VMs 150, 152, 154 that perform at least part of the described VNF, as will be described below.

Figure 3:
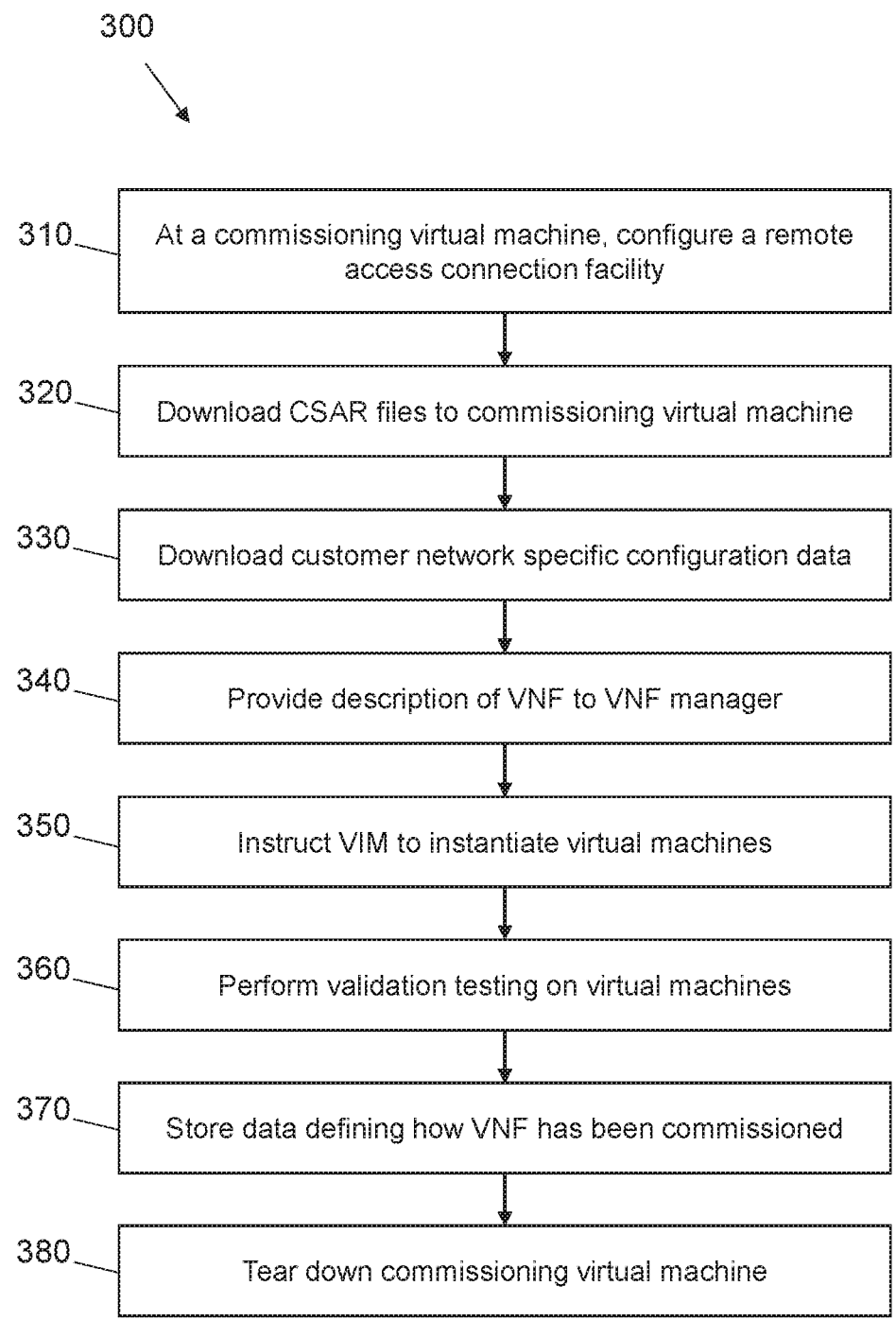
FIG. 3 shows a flow chart depicting a method of commissioning a virtualized network function according to embodiments of the present disclosure.

Referring to FIG. 3, there is shown a method 300 of commissioning a VNF according to embodiments of the present disclosure. The method 300 may be performed at least in part by the commissioning VM 110 described with reference to FIG. 1.

At item 310, the remote access connection facility 115 is configured at the commissioning VM 110, as described with reference to FIG. 2 above.

At item 320, download of at least one cloud service archive (CSAR) file 130 is caused, via the remote access connection facility 115. In embodiments, a plurality of CSAR files 130 are downloaded. The at least one CSAR file 130 contains configuration data for commissioning the VNF. Such configuration data may, in some examples, be non-specific to the particular customer network. In alternative embodiments, the at least one CSAR file 130 contains customer-specific configuration data. The at least one CSAR file 130 may contain configuration data that relates to one or more particular types of VNF. In other words, the at least one CSAR file 130 may contain VNF description data. Different CSAR files may contain description data for different VNFs. In some examples, a given CSAR file contains description data for multiple VNFs. The at least one CSAR file 130 may contain one or more software images. The at least one CSAR file 130 may contain other data and/or files in other embodiments. For example, the at least one CSAR file 130 may contain tests (or data useable indicating such tests) that are applicable to a given VNF. The at least one CSAR file 130 is downloaded to the commissioning VM 110, e.g. for storage and/or further processing. In alternative embodiments, file and/or data types other than CSAR files are used to obtain configuration data.

In embodiments, the at least one CSAR file 130 is downloaded from a predetermined location and/or address. The at least one CSAR file 130 may be downloaded automatically in some examples. For example, the at least one CSAR file 130 may be downloaded in response to instantiation of the commissioning VM 110. Such automated download of CSAR files may be faster and/or less prone to human error than a case in which one or more CSAR files are obtained manually.

In embodiments, the at least one CSAR file 130 is executed by the commissioning VM 110. In embodiments, the at least one CSAR file 130, upon execution by the commissioning VM 110, is operable to provide description data to the VNF descriptor component 112 that is within the commissioning VM 110. Such description data may be used to provide the VNF descriptor component 112 with a template defining the VNF that is to be commissioned in the customer network.

At item 330, download of customer network specific configuration data is caused, via the remote access connection facility 115. The customer network specific configuration data may be user-defined. For example, the customer network specific configuration data may be obtained via user input, e.g. by a remote commissioning engineer accessing the commissioning VM 110 via the remote access connection facility 115. In some examples, the customer network specific configuration data is downloaded from a predetermined location and/or file, having been previously stored in said location and/or file.

The customer network specific configuration data comprises configuration data that is specific to the particular customer network in which the VNF is to be commissioned. For example, the customer network specific configuration data may include data relating to one or more of: available physical resources, available virtual resources, desired network size, population, type, location, infrastructure, storage and any other capabilities and/or properties of the customer network. Such configuration data may not be present in the CSAR files 130, which contain more general, non-customer network specific configuration data. The customer network specific configuration data may be used to supplement and/or enhance the configuration data obtained from the downloaded CSAR files 130.

In embodiments, the downloaded customer network specific configuration data is stored in the version control component 115 within the commissioning VM 110. Such configuration data may be stored for further use during and/or after the commissioning process.

At item 340, the VNF descriptor component 112 of the commissioning VM 100 provides a description of the VNF to the VNF manager component 116. The description of the VNF is provided on the basis of customer network specific configuration data and data obtained from the at least one CSAR file 130. In embodiments, the VNF descriptor component 112 is configured to combine the customer network specific configuration data with the data obtained from the least one CSAR file 130. The customer network specific configuration data may be provided to the VNF descriptor component 112 by the version control component 118. In other words, the customer network specific configuration data may be downloaded, stored on the version control component 118, and then provided to the VNF descriptor component 112. In alternative embodiments, the customer network specific configuration data is provided to the VNF descriptor component 112 by other means, e.g. by receiving data via the remote access connection facility 115 without storing such data in the version control component 118. In embodiments, the customer network specific configuration data is used to fill in details in the VNF description data obtained from the CSAR files 130. For example, the customer network specific configuration data may be used to populate a template obtained from the CSAR files 130. In other words, generic CSAR files are modified on-site with customer-specific configuration data to obtain VNF descriptions. Providing the description of the VNF to the VNF manager component 116 is an example of configuring the VNF manager component 116.

In embodiments, the version control component 118 is configured to provide configuration data to the VNF manager component 116 during commissioning of the VNF. Such configuration data may comprise customer network specific configuration data. In embodiments, the configuration data provided by the version control component 118 comprises "Day 0" configuration data. "Day 0" configuration data comprises data to enable an initial setup of VMs. For example, "Day 0" configuration data may enable each newly-commissioned VM to be booted (or "spun") up, and/or to obtain an IP address. An IP address allows a given VM to communicate with other virtual and/or non-virtual machines. Therefore, the commissioning VM 110 may be considered to be responsible for at least "Day 0" of the commissioning process.

At item 350, the VNF manager component 116 is caused to instruct the VIM component 140 to instantiate one or more VMs 150, 152, 154 in the virtualized environment 100. Such an instruction from the VNF manager component 116 is on the basis of the description of the VNF provided by the VNF descriptor component 112 at item 340. Therefore, the VNF manager component 116 is able to cause instantiation of the VMs 150, 152, 154 based on the correct (and/or current) start of day configuration data. For example, the VIM component 140 can provide Day 0 configuration data (e.g. IP addresses) to the VMs 150, 152, 154 that it instantiates, as instructed by the VNF manager component 116.

In embodiments, the one or more VMs 150, 152, 154 comprise a deployment manager component. The one or more VMs 150, 152, 154 also comprise one or more VNF component instantiations (VNFCIs). In such embodiments, the deployment manager component is configured to manage configuration of the one or more VNFCIs during commissioning of the VNF. The deployment manager component may manage a topology of the one or more VNFCIs, for example. That is, the deployment manager may be configured to manage interrelationships between different VNFCIs. The deployment manager component may use "Day 1" configuration data to manage the one or more VNFCIs. "Day 1" configuration data may be used at a later stage in the commissioning process compared to the "Day 0" configuration data provided by the version control component 118 within the commissioning VM 110.

At item 360, a VNF testing component 120 within the commissioning VM 110 is caused, via the remote access connection facility 115, to perform, during commissioning of the VNF, testing of the operation of the one or more VMs 150, 152, 154. In alternative embodiments, the VNF testing component 120 is configured to perform the testing automatically, e.g. based on a predetermined trigger event. Examples of such a trigger event include, but are not limited to, expiry of a predetermined time period, instantiation, updating, upgrading and/or teardown of VMs and/or VNFs, a VNF version upgrade, a VNF version rollback, a topology change, a hardware change and a disaster recovery.

In alternative embodiments, the commissioning VM 110 downloads a CSAR file that contains customer network specific configuration data, rather than generic configuration data. In such embodiments, a VNF description may be extracted from the CSAR file directly into the VNF manager component 116. Therefore, there may be no need to modify generic configuration files on-site with customer-specific configuration data. Thus, in some embodiments, the commissioning VM 110 does not comprise a VNF descriptor component 112. In some embodiments, generic configuration files are modified on-site with customer-specific configuration data, but in the absence of a VNF descriptor component 112.

In embodiments, the testing comprises environment readiness testing. Environment readiness testing may be performed by interrogating the VIM component 140. The environment readiness testing may test whether the environment 100 has sufficient physical and/or virtual resources to fulfil commissioning of the VNF, e.g. to run and/or maintain the VNF. Such environment readiness testing may be performed prior to the one or more VMs 150, 152, 154 being instantiated.

In embodiments, the testing comprises interoperability testing between a first VNFCI within a first VNF and a second VNFCI within a second VNF, different from the first VNF. The first and second VNFs comprise a subset of VNFs within a plurality of VNFs in the virtualized environment. The interoperability test comprises instructing the first VNFCI to interoperate directly with the second VNCFI in a predetermined manner, and determining whether the second VNFCI reacts to the instructed interoperation in an expected manner.

In embodiments, the testing comprises VNFCI validation testing. Such VNFCI validation testing may involve testing that the state of a given VNFCI is as expected. In some examples, VNFCI validation testing involves testing consistency across a cluster of VNFCIs within a given VNF.

In embodiments, the testing comprises end-to-end integration testing across a plurality of VNFs in the environment 100. End-to-end integration testing may involve testing that a chain of VNFCIs across a plurality of VNFs behaves in an expected manner.

In embodiments, the VNF testing component 120 is configured to perform acceptance testing of the one or more VMs 150, 152, 154. Acceptance testing may be performed after end-to-end integration testing. In embodiments, acceptance testing comprises configuring each instantiated VNFCI with customer configuration data and determining whether each VNFCI operates in an expected manner. The customer configuration data may be specific to the particular customer network. As such, the acceptance testing allows the VNF testing component 120 to confirm that the VNFs are behaving in a manner that the customer expects.

At item 370, data defining how the VNF has been commissioned is stored within the customer network, and/or is uploaded via the remote access connection facility 115. In embodiments, such data is stored in the version control component 118. Such data may comprise the "Day 0" data as described above. The data defining how the VNF has been commissioned is for future use in one or more of: a disaster recovery, a VNF version upgrade, and a VNF version rollback. The data defining how the VNF has been commissioned may be for future use in other scenarios in other embodiments. In some cases, the data defining how the VNF has been commissioned is used by the VNF testing component 120, e.g. as a reference from which to ascertain expected behavior of VNFCIs within the environment 100. In some examples, the data defining how the VNF has been commissioned is used for debugging and/or diagnosis purposes. Such debugging and/or diagnosis may be performed by the commissioning VM 110, for example.

In embodiments, the version control component 118 is configured to provide configuration data to the one or more VMs 150, 152, 154 during commissioning of the VNF. Such configuration data may be provided "directly", i.e. not via the VNF manager component 116 and/or the VIM component 140. In alternative embodiments, such configuration data is provided by the version control component 118 via the VNF manager component 116 and/or the VIM component 140. Such configuration data may comprise "Day 2" configuration data. "Day 2" configuration data may be used at a later stage in the commissioning process compared to both "Day 0" configuration data and "Day 1" configuration data.

At item 380, in response to completion of the commissioning of the VNF, the commissioning VM 110 is torn down. As such, the commissioning VM 110 is used for commissioning the VNF, and once that commissioning process is completed, the commissioning VM 110 is torn down rather than being left running on the customer network. In embodiments, teardown of the commissioning VM 110 is performed in response to a predetermined trigger. An example of such a trigger is a received confirmation that the commissioned VNF is performing as expected (e.g. following validation testing). In embodiments, teardown of the commission VM 110 is in response to receipt of a command via the remote access connection facility 115. That is, a remote engineer operating the commissioning VM 110 remotely can initiate teardown of the commissioning VM 110 once the commissioning process is completed. Tearing down the commissioning VM 110 saves resources (e.g. storage resources, processing resources, and/or memory resources) compared to a case in which such teardown does not occur. Further, tearing down the commissioning VM 110 increases the security of the customer network, since the remote access connection facility 115 (located within the commissioning VM 110) may also be torn down, thereby reducing the number of channels via which a malicious party could potentially infiltrate the customer network.

Where the at least one VM 150, 152, 154 comprises a deployment manager component (as described above), the deployment manager component may be torn down according to embodiments of the present disclosure, in response to completion of the commissioning of the VNF. Tearing down the deployment manager after completion of the commissioning process saves resources (e.g. storage resources, processing resources and/or memory resources) compared to a case in which such teardown does not occur. Teardown of the deployment manager may be caused by the commissioning VM 110. For example, teardown of the deployment manager may form part of the teardown of the commissioning VM 110, or may be triggered by such. In some cases, the deployment manager is torn down and the commissioning VM 110 is not torn down, or vice-versa. In alternative embodiments, neither the commissioning VM 110 nor the deployment manager is torn down.

In embodiments, the commissioning VM 110 can be used to restore the VNF as part of disaster recovery. In examples where the commissioning VM 110 has previously been torn down, it may be reinstantiated by the customer in a relatively simple manner, and the subsequent steps in the recovery process (e.g. recreation of the VNF) may be performed by a remote engineer accessing the commissioning VM 110 via the remote access connection facility 115. In embodiments, the VNF is recreated using data previously stored by the commissioning VM 110. Such data may define how the VNF was previously commissioned. Such data may comprise (or be derived from) "Day 0" data as described above. This provides a more efficient and/or reliable recovery compared to a case in which such configuration data is not stored for such use.

In alternative embodiments, the commissioning VM 110 does not comprise a version control component 118. The functionality provided by the version control component 118 could be housed remotely, for example. In some examples, customer network specific configuration data is stored as one or more basic files, which may be interpreted at runtime by one or more components of the commissioning VM 110.

The commissioning VM 110 as described above may be comprised in or implemented in apparatus comprising a processor or processing system. The processing system may comprise one or more processors and/or memory. Each device, module, component, machine or function as described in relation to any of the examples described herein may similarly comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of commissioning, by a commissioning virtual machine, a virtualised network function (VNF) in a virtualised environment of a customer network, the commissioning virtual machine sent by a VNF provider network to the customer network, the commissioning virtual machine comprising a remote access connection facility configured to enable access to the commissioning virtual machine remotely from outside of the customer network by the VNF provider network, wherein the commissioning virtual machine is configured to initiate a commissioning process and access a virtual infrastructure manager (VIM) component of the virtualised environment, the method comprising:
    downloading, via the remote access connection facility, at least one cloud service archive (CSAR) file and customer network specific configuration data, wherein the CSAR file is operable to provide description data to a VNF descriptor component of the commissioning virtual machine;
    providing, by the VNF descriptor component to a VNF manager component of the commissioning virtual machine, a description of the VNF based on data obtained from the at least one CSAR file and the customer network specific configuration data;
    receiving an instruction from the VNF provider network via the remote access connection facility; and
    in response to receiving the instruction, causing the VNF manager component-to instruct the VIM component to instantiate one or more virtual machines in the virtualised environment based on the description of the VNF provided by the VNF descriptor component, the one or more virtual machines being operable to perform at least a part of the VNF, wherein control of the commissioning virtual machine is limited to a pre-approved set of actions, wherein actions available to the customer network include instantiation of the commissioning virtual machine, and actions available to the VNF provider network include instructing the VIM component to instantiate the virtual machines in the virtualised environment.

2. The method according to claim 1, wherein the one or more virtual machines comprise a deployment manager component and one or more VNF component instantiations, the deployment manager component being configured to manage configuration of the one or more VNF component instantiations during commissioning of the VNF.

3. The method according to claim 2, further comprising, in response to completion of the commissioning of the VNF, tearing down the deployment manager component.

4. The method according to claim 1, wherein the commissioning virtual machine comprises a version control component, the method further comprising:
    storing the downloaded customer network specific configuration data in the version control component.

5. The method according to claim 4, wherein the version control component is configured to provide configuration data to the VNF manager component during commissioning of the VNF.

6. The method according to claim 4, wherein the version control component is configured to provide configuration data to the one or more virtual machines during commissioning of the VNF.

7. The method according to claim 1, wherein the instruction is a first instruction, further comprising:
    in response to a second instruction received via the remote access connection facility, testing, by a VNF testing component within the commissioning virtual machine, operation of the one or more virtual machines.

8. The method according to claim 7, wherein the testing comprises interoperability testing.

9. The method according to claim 7, wherein the testing comprises virtual network function component instantiation (VNFCI) validation testing.

10. The method according to claim 7, wherein the testing comprises end-to-end integration testing.

11. The method according to claim 7, wherein the testing comprises acceptance testing.

12. The method according to claim 7, wherein the VNF testing component is configured to perform environment readiness testing.

13. The method according to claim 1, wherein the remote access connection facility comprises a virtual private network connection facility.

14. The method according to claim 1, further comprising uploading via the remote access connection facility, or storing within the customer network, data defining how the VNF has been commissioned for future use in one or more of:
    a disaster recovery,
    a VNF version upgrade, and
    a VNF version rollback.

15. A system comprising:
    at least one processor; and
    at least one memory including computer program code that, when executed by the at least one processor, cause the system at least to perform operations for commissioning a virtualised network function (VNF), the operations comprising:

sending to a virtualised environment of a customer network, a commissioning virtual machine comprising a remote access connection facility configured to enable access to the commissioning virtual machine remotely from outside of the customer network, wherein the commissioning virtual machine is configured to initiate a commissioning process and access a virtual infrastructure manager (VIM) component of the virtualised environment;

uploading, to the commissioning virtual machine via the remote access connection facility, at least one cloud service archive (CSAR) file and customer network specific configuration data, wherein the CSAR file is operable to provide description data to a VNF descriptor component of the commissioning virtual machine;

wherein the VNF descriptor component is configured to provide, to a VNF manager component of the commissioning virtual machine, a description of the VNF based on data obtained from the at least one CSAR file and the customer network specific configuration data;

sending an instruction to the commissioning virtual machine via the remote access connection facility; and wherein in response to receiving the instruction, the commissioning virtual machine is configured to cause the VNF manager component to instruct the VIM component to instantiate one or more virtual machines in the virtualised environment based on the description of the VNF provided by the VNF descriptor component, the one or more virtual machines being operable to perform at least a part of the VNF, wherein control of the commissioning virtual machine is limited to a pre-approved set of actions, wherein actions available to the customer network include instantiation of the commissioning virtual machine, and actions available to the system include instructing the VIM component to instantiate the virtual machines in the virtualised environment.

16. A computer program product comprising a non-transitory computer-readable storage medium having computer-readable instructions stored thereon, the computer-readable instructions being executable by a computerized device to cause the computerized device to perform operations for commissioning a virtualised network function (VNF) in a virtualised environment of a customer network, the operations comprising:

instantiating a commissioning virtual machine comprising a remote access connection facility configured to enable access to the commissioning virtual machine remotely from outside of the customer network by a VNF provider network, wherein the commissioning virtual machine is configured to initiate a commissioning process and access a virtual infrastructure manager (VIM) component of the virtualised environment;

downloading, via the remote access connection facility, at least one cloud service archive (CSAR) file and customer network specific configuration data, wherein the CSAR file is operable to provide description data to a VNF descriptor component of the commissioning virtual machine;

providing, by the VNF descriptor component to a VNF manager component of the commissioning virtual machine, a description of the VNF based on data obtained from the at least one CSAR file and the customer network specific configuration data;

receiving an instruction from the VNF provider network via the remote access connection facility; and in response to receiving the instruction, causing the VNF manager component-to instruct the VIM component to instantiate one or more virtual machines in the virtualised environment based on the description of the VNF provided by the VNF descriptor component, the one or more virtual machines being operable to perform at least a part of the VNF, wherein control of the commissioning virtual machine is limited to a pre-approved set of actions, wherein actions available to the customer network include instantiation of the commissioning virtual machine, and actions available to the VNF provider network include instructing the VIM component to instantiate the virtual machines in the virtualised environment.

17. The system according to claim 15, further comprising computer program code that, when executed by the at least one processor, cause the system to perform operations comprising:

in response to completion of the commissioning of the VNF, tearing down the commissioning virtual machine.

18. The computer program product according to claim 16, wherein the commissioning virtual machine comprises a version control component, further comprising computer-readable instructions stored thereon, the computer-readable instructions being executable by a computerized device to cause the computerized device to perform operations comprising:

storing the downloaded customer network specific configuration data in the version control component;

wherein the version control component is configured to:
provide configuration data to the VNF manager component during commissioning of the VNF; and
provide configuration data to the one or more virtual machines during commissioning of the VNF.

19. The computer program product according to claim 16, wherein the one or more virtual machines comprise a deployment manager component and one or more VNF component instantiations, the deployment manager component being configured to manage configuration of the one or more VNF component instantiations during commissioning of the VNF.

20. The computer program product according to claim 16, wherein the instruction is a first instruction, further comprising computer-readable instructions stored thereon, the computer-readable instructions being executable by a computerized device to cause the computerized device to perform operations comprising:

in response to a second instruction received via the remote access connection facility, testing, by a VNF testing component within the commissioning virtual machine, operation of the one or more virtual machines, wherein the testing comprises one or more of:
interoperability testing;
virtual network function component instantiation (VNFCI) validation testing;
end-to-end integration testing;
acceptance testing; or
environment readiness testing.

* * * * *